United States Patent [19]

Karr, Jr.

[11] 4,452,462
[45] Jun. 5, 1984

[54] TEMPERATURE RESISTANT JOINT PACKING WITH E-SHAPED SPRING SEAL

[75] Inventor: Michael A. Karr, Jr., Houston, Tex.

[73] Assignee: Gray Tool Company, Houston, Tex.

[21] Appl. No.: 539,595

[22] Filed: Oct. 6, 1983

[51] Int. Cl.³ ............................................. F16J 15/08
[52] U.S. Cl. ................................. 277/105; 277/167.5; 277/206 R; 277/236; 277/26; 285/336; 285/DIG. 18
[58] Field of Search ................... 277/105, 106, 167.5, 277/205, 206 R, 212 R, 212 C, 214, 236, 26; 285/336, DIG. 18

[56] References Cited

U.S. PATENT DOCUMENTS

| | | | |
|---|---|---|---|
| 2,552,750 | 5/1951 | Thornhill | 277/167.5 |
| 3,078,110 | 2/1963 | Starr | 285/336 |
| 3,192,690 | 7/1965 | Taylor | 277/205 X |
| 3,291,506 | 12/1966 | Blakeley | 277/206 R X |
| 3,797,836 | 3/1974 | Halling | 277/206 R X |
| 3,857,572 | 12/1974 | Taylor et al. | 277/206 R X |
| 4,067,585 | 1/1978 | Rode | 277/206 R X |

FOREIGN PATENT DOCUMENTS 969210  6/1975  Canada ............................... 277/236

*Primary Examiner*—Robert S. Ward
*Attorney, Agent, or Firm*—Troxell K. Snyder

[57] ABSTRACT

A metallic spring member 30 cooperates with grooves 32, 34 disposed in pressure containing members 10, 12. The spring member 30 has an E-shaped cross section and is compressed both horizontally and vertically when the members 10, 12 are fully engaged. The seal is self-energizing under normal operating conditions and able to accommodate small, but significant relative motion between the pressure containing members 10, 12 during conditions of abnormally high and unevenly distributed temperature.

10 Claims, 6 Drawing Figures

TEMPERATURE RESISTANT JOINT PACKING WITH E-SHAPED SPRING SEAL

FIELD OF THE INVENTION

The present invention relates to a means for effecting a sealed connection between two pressure containing members, and more particularly to a joint packing between two pressure containing members which is resistant to high temperature and high pressure service conditions.

BACKGROUND OF THE INVENTION

The fact that sealed pressure joints must, on occasion, perform under conditions of high temperature and pressure is well known in the art of fluid and material transfer. One such industry in which such connections are frequently used is in the oil production industry for the transfer and control of highly flammable liquids and gases. Seals are found in flanged pipe connections and at the interface between the valve body and valve bonnet in a control or other type of valve. In this industry it is well known that such flat-faced surface seals must undergo conditions of extreme temperature, corrosive environment, thermal shock, pressure cycling, vibration, or any combination of these or other conditions. One effective sealing means in use today is a metal-to-metal seal formed by the insertion of a seal ring between the flat-faced surfaces for the formation of a metal-to-metal seal therebetween.

Recent design specifications for well head equipment have required that the seals used in this equipment be able to resist extremely high temperatures such as would be present in the event of a well head or other fire. The abundance of flammable material present in such applications, as well as the potential for increased harm if a leak should occur, combine to make this requirement an essential and desirable goal. This requirement has been made even more demanding by the imposition of an additional condition that the seal employed for fire resistant well head service be able to maintain its integrity under conditions of uneven heating such as might occur if an intense flame was in contact with one portion of the sealed equipment while the other portion was subjected to a relatively cool environment.

The uneven heating requirement of this new standard has resulted in less than satisfactory test performance by the seal designs currently in use. The uneven expansion of the pressure containing members can allow leakage past the seal resulting in failure of the equipment and seal to meet the exacting standards of the fire resistant test. Such a test may be exemplified by the requirements embodied in various industry association's standards, those of the American Petroleum Institute being typical.

What is required is a metal-to-metal sealing system which is effective under conditions of extreme pressure and temperature, and which is suitable for use in well head applications wherein test requirements call for maintenance of seal integrity under conditions of extremely uneven heating of the subject equipment.

SUMMARY OF THE INVENTION

The present invention provides a system for sealing a pressurized joint wherein two flat-faced pressure containing members are each provided with a corresponding groove along the desired seal line. Each groove is tapered when viewed in cross section, being wider near the flat-faced surface and decreasing in width with depth. A spring member, having an approximately E-shaped cross section formed of a central web portion and two curved, semi-circular arms is disposed within the groove and compressed both horizontally and vertically between the surfaces of the grooves when the flat-faced surfaces are mated together. The E-shape of the spring member faces the pressurized region, thus resulting in a pressure-energized seal. A stop member can also be located within the corresponding grooves for preventing excessive deflection of the web of the spring member under high pressure conditions. The spring member may be fabricated of material identical to that forming the flat-faced surfaces, thus minimizing corrosion and differential thermal expansion.

The present invention has, therefore, a primary object of forming a metal-to-metal pressure seal between two flat-faced pressure containing members. A further object of the present invention is to form a self-energizing seal in a cooperative relationship with the surfaces to be sealed. It is a still further object of the system according to the present invention to provide a system for sealing well head type equipment under conditions of extreme pressure and uneven temperature distribution such as may occur during a fire at the well head.

BRIEF DESCRIPTION OF THE DRAWING FIGURES

DESCRIPTION OF THE PREFERRED EMBODIMENT

Figure 1:
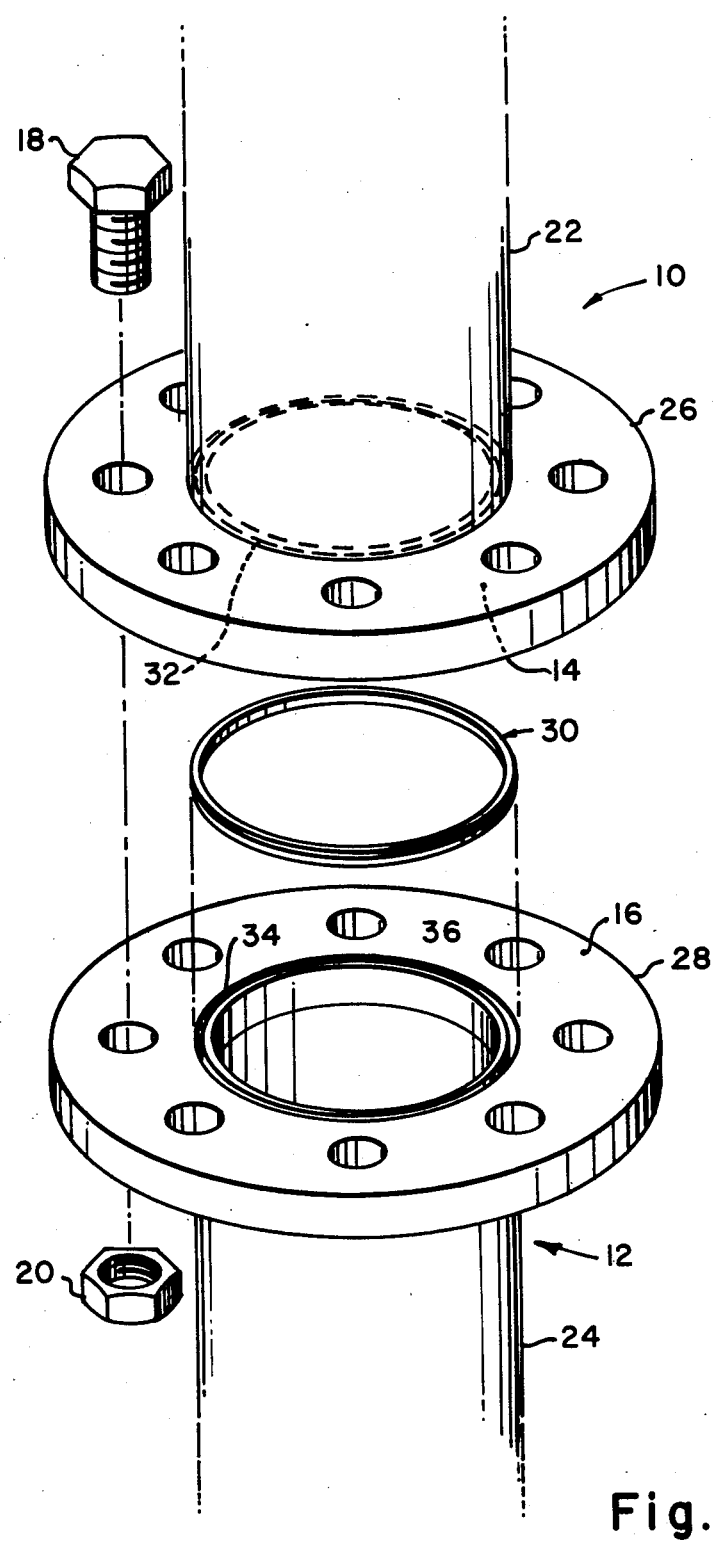
FIG. 1 shows the general arrangement of the sealing system according to the present invention prior to assembly.

FIG. 1 shows a pair of pressure containing members 10, 12 in an unassembled condition. It is characteristic of pressure containing members that each have a corresponding seal surface 14, 16 which will be urged together by clamping means shown typically as the bolt 18 and nut 20 in the drawing figure.

Although FIG. 1 depicts the pressure containing members as a pair of pressure conduits 22, 24 each having respective flanges 26 and 28, it is to be understood that the term "pressure containing member" as used herein is meant to denote any of a variety of separate members which may be joined together in a sealing relationship at a substantially planer interface, such as the joint between a valve body and a valve bonnet, a pressure nozzle and a blanking plate, a diaphragm and a pressure vessel, and any of a variety of similar structures of which the flanged pipe arrangement depicted in FIG. 1 is only an illustrative representation.

It is common in the art to use sealing rings between the seal surfaces of the pressure containing members to assist in preventing leakage of pressurized material from the established joint. In the oil and gas industry in particular, it is desirable to use metal-to-metal joint packing to avoid possible failure during adverse temperature, pressure, or other environmental conditions. FIG. 1 shows the system according to the present invention to be of a similar structure, having a spring member 30 for insertion between the pressure containing members 10, 12 prior to engagement. According to the present invention, the spring member 30 fits within a pair of corresponding opposing grooves 32, 34 which cooperate with the spring member to effect the sealing system.

The grooves 32, 34 and the spring member 30 form a seal line representing a boundary between the pressurized region 36, shown in FIG. 1 as including the bore of the pressure containing members 10, 12, and the surrounding environment. This sealing line need not be circular in shape when viewed in the plane of the engaged pressure containing members 10, 12 but may alternatively be oval, oblate, or any of a variety of generally closed shapes depending upon the particular application and sealing configuration required. In particular, in the case of a well head blow out preventer, it is desired to form a single seal surrounding a pair of parallel pressure conduits, resulting in an oval shape sealing line for this type of pressure connector. The sealing system according to the present invention, by not requiring that the sealing line be circular in shape, is thus adaptable to a wide variety of sealing situations wherein the sealing line to be established would preferably be other than circular in shape. The structure and details of this sealing system are hereinafter disclosed.

Figure 2:
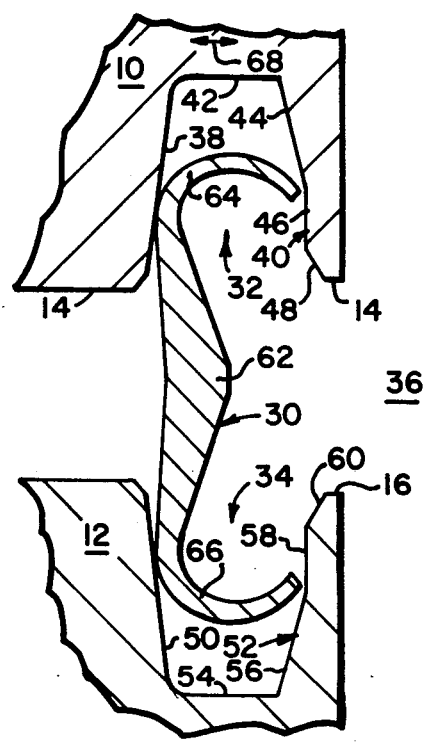
FIG. 2 shows a detailed cross section view of the sealing system according to the present invention prior to complete engagement.

FIG. 2 shows a detailed cross sectional view of the spring member 30 positioned between the seal surfaces 14, 16 of the pressure containing members 10, 12. The first pressure containing member 10 is shown with a groove 32 having sloping side surfaces 38, 40 and a bottom surface 42 generally parallel with the plane of the seal surface 14. The separation of the first groove side surfaces 38, 40 in general decreases as the depth beneath the sealing surface 14 of the first pressure containing member 10 increases. The inner side surface 40 in the preferred embodiment includes at least 3 separate segments, a first sloping surface, or chamfer, 44 proximate the bottom surface 42, a non-sloping surface 46, perpendicular to the plane of the seal surface 14 and intermediate the first chamfer and the seal surface 14, and a second chamfer 48 located adjacent the seal surface 14. The function and advantages achieved by the use of this particular side surface configuration will be discussed below.

Also shown in FIG. 2 is the second groove 34 disposed beneath the seal surface 16 of the second pressure containing member 12. The second groove 34 is identical in configuration with the first groove 32, having side surfaces 50, 52, a bottom surface 54, a first sloping surface or chamfer, 56 a non-sloping section 58, and a second chamfer 60. Grooves 32 and 34 are, in essence, 3-dimensional mirror images of each other and are herein referred to as first and second grooves merely for the sake of convenience rather than as an indication of a preference or difference therebetween.

Shown partially inserted in the grooves 32, 34 is the spring member 30 which has a generally E-shaped cross section. A web 62 forms the central portion of the E-shape, with two outer opposing curved arms 64, 66 forming the balance of the E. The spring member 30 is shown in a "pre-inserted" state wherein the curved arms 64, 66 have been partially inserted in the grooves 32, 34, but have not been compressed or otherwise deformed. In the preferred embodiment according to the present invention, the horizontal dimension of each curved arm 64, 66 is less than the horizontal separation between the corresponding unsloped side surface segments 46, 58 and the outer side surfaces 38, 50. This allows the spring member 30 to be easily inserted between the pressure containing members 10, 12 during makeup of the pressure joint. By allowing adequate clearance in this pre-inserted state, the sealing system according to the present invention allows the existence of a slight horizontal misalignment 68 between the pressure containing members 10, 12. This misalignment 68 can easily occur in large pressure joints prior to tightening of the clamping means 18, 20. By allowing the spring member 30 to freely move within the grooves 32, 34 prior to full engagement, the system according to the present invention avoids any damage which may occur to a compressed spring member as the pressure containing members 10, 12 are aligned upon final engagement of the pressure joint. The spring member 30 is thus uncompressed and easily re-aligned in the grooves 32, 34 until just prior to the full engagement of the pressure containing members 10, 12.

Figure 3:
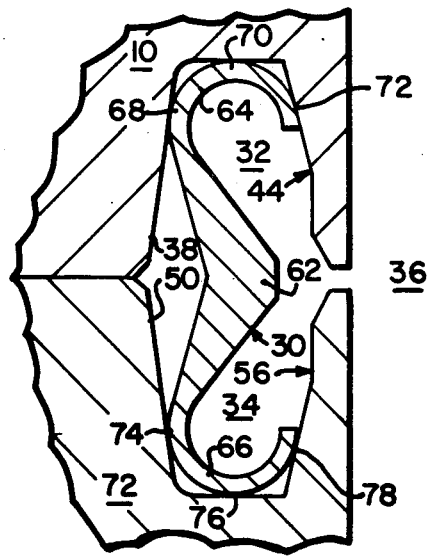
FIG. 3 shows the sealing system according to the present invention following full engagement.

FIG. 3 shows a cross sectional view of the grooves 32, 34 and the spring member 30 following full engagement of the pressure containing members 10, 12. As can be seen from the drawing figure, the curved arms 64, 66 are horizontally compressed between the sloping side surfaces 50, 52 and 38, 40 of the grooves 32, 34. The entire spring member 30 has been compressed in the vertical direction between the grooves 32, 34 resulting in displacement of the web portion 62 in a horizontal direction toward the interior of the pressurized joint. Each arm 64, 66 contacts the corresponding groove 32, 34 at three sealing points 68, 70, 72 for curved arm 64 and 74, 76, 78 for curved arm 66. Under conditions of zero relative internal pressure, the sealing contact is maintained by the resiliency of the compressed spring member 30.

The self-energizing feature of the sealing system according to the present invention is now apparent. Under pressurized conditions, the pressure within the cavity 36 exerts an outward, expanding force on the curved arms 64, 66, as well as a horizontal force on the web portion 62 of the spring member 30. The result of the horizontal force on the web portion 62 is to urge the curved arms 64, 66 more tightly against the groove surfaces at the sealing points 68, 70 and 74, 76. It can thus be seen by inspection of FIG. 3 that the system according to the present invention will thus be induced to seal even more tightly by increased pressure within the pressurized region 36.

Figure 4:
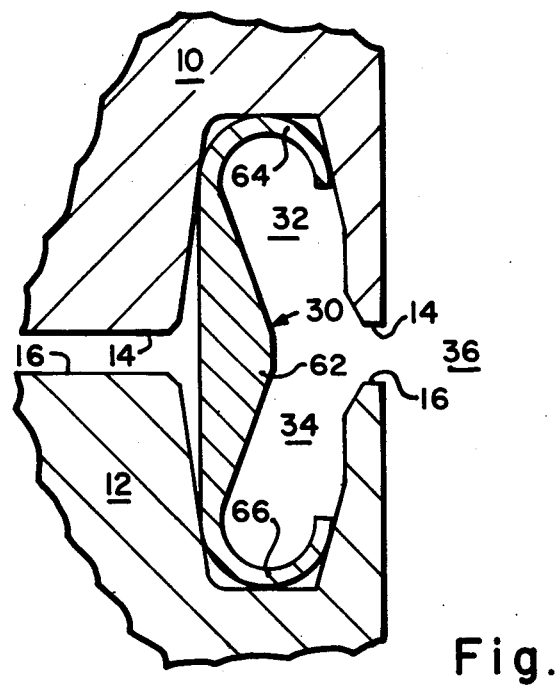
FIG. 4 shows a cross sectional view of the sealing system while being subjected to abnormally high temperature.

Moreover, due to the horizontal compression of the curved arms 64, 66 and to the overall vertical compression of the spring member 30, the spring member 30 in the preferred embodiment of the present invention can accommodate small but significant changes in the configuration and separation of the pressure containing members 10, 12, as shown in FIG. 4. This is especially useful under conditions of high temperature when the clamping means 18 may expand unevenly about the circumference of the pressure containing member due to an uneven temperature distribution. Under adverse conditions, the grooves 32, 34 may shift in both horizontal and vertical relative position, usually causing a failure of prior art sealing systems. The system according to the present invention, due to the resilient construction of the spring member 30 as well as the self-energizing feature discussed above, can accommodate the relative motion expected during an accidental fire or other extreme condition. This augmented temperature resistance over prior art designs is supported not only by inspection of the design details disclosed herein, but also by actual test experience in accordance with independently established fire test criteria.

It should be noted at this point, that the spring member under normal operating conditions is subjected to substantially elastic deformation, with little or no plastic deformation taking place. This results in maintenance of the resilient quality necessary to permit successful sealing under adverse temperature and pressure conditions. Although a variety of resilient materials may be used in construction of the spring member 30, it is preferable to use a material identical to that of the pressure containing members 10, 12, thus avoiding any problems with galvanic reaction, corrosion, or other material incompatibility.

FIG. 4 shows the preferred embodiment under a condition of elevated temperature and pressure. The pressure containing members 10, 12 have separated due to expansion of the clamping means 18, 20 as a result of the elevated temperature condition. The web portion 62 is shown extended fully in the vertical direction, both as a result of its inherent tendency to relieve the compressive deformation imposed during the engagement process and the influence of the internal pressure present in the pressurized region 36. As can be seen clearly in FIG. 4, the sealing system according to the present invention remains in full sealing engagement despite the separation of the pressure containing members 10, 12. It should be noted that the web portion 62 of the spring member 30 is possessed of a sufficient cross sectional area so as to maintain the structural integrity of the spring member under the adverse temperature and pressure conditions and to thereby avoid a failure which would allow the escape of the pressurized material through the joint.

Figure 5:
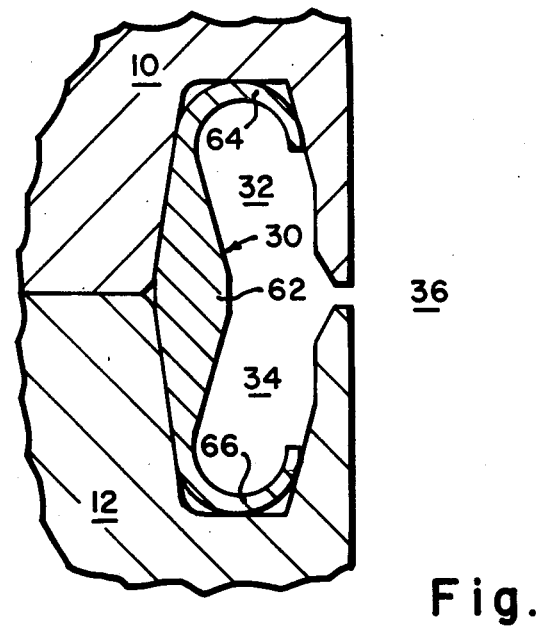
FIG. 5 shows the sealing system following cooling after an abnormally high temperature condition.

Following relief of the high temperature condition, the clamping means or bolts 18 will return to their original length, reducing the separation between the flanged members 10, 12. FIG. 5 shows the spring member 30 following the cooling from a high temperature, high pressure condition. As can be seen in the drawing figure, the central web portion 62 has not returned to the original shape shown in FIG. 3, but has instead been deformed outward as a result of the extreme pressure and temperature conditions. Although deformed, the spring member 30 is still sealingly engaged with the surfaces of the grooves 32, 34 in the pressure containing members 10, 12 and is still effective in preventing leakage therebetween. The toggling feature, however, is no longer available in the spring member and the system would therefore be subject to possible failure in a repeated excess temperature condition. It is presently contemplated that the spring member and other components of the pressure connection would be repaired or replaced following a fire or other extreme temperature occurrence, including the placement of a fresh spring member 30 within the pressure joint.

Figure 6:
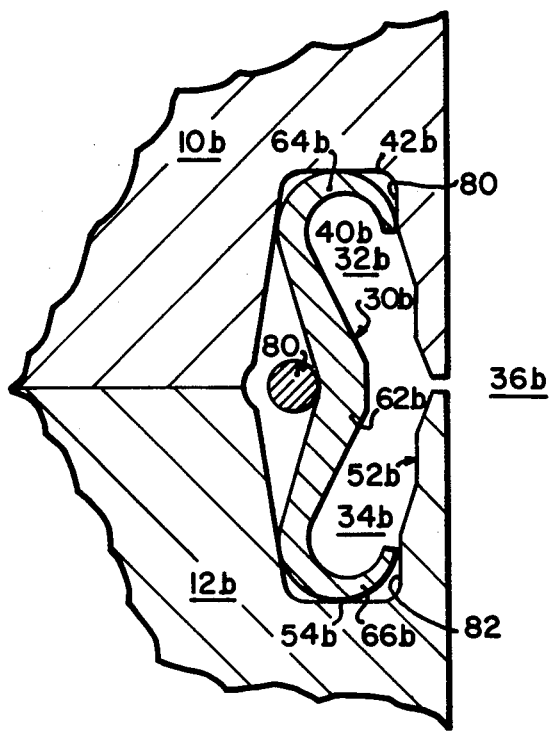
FIG. 6 shows an alternative embodiment of the present invention.

FIG. 6 shows an alternative embodiment of the sealing system according to the present invention wherein like elements are designated by like numerals with the suffix "b", and in which the web section 62b of the spring member 30b is of a cross sectional thickness not much greater than that of the curved arms 64b, 66b. In this embodiment of the present invention, it is necessary to add a stop member 80 behind the web 62b in order to prevent excessive deflection and potential failure of the spring member 30b under elevated temperature and pressure conditions. The stop member 80 is disclosed in FIG. 6 as being a split ring of circular cross section disposed about the spring member 30 proximate the web 62b. This feature is not required in the preferred embodiment of the present invention due to the thickened web cross sectional dimension as shown in FIGS. 2-5.

Also shown in FIG. 6 is a modification of the groove inner side surfaces 40b, 52b. The compressed spring member arms 64b, 66b are shown contacting unsloped segments 80, 82 located adjacent the respective groove bottom surfaces 42b, 54b. This configuration allows augmented control of the degree of horizontal compression of the arms 64b, 66b and may be a preferable feature for a variety of applications.

The sealing system according to the present invention thus provides a simple, effective joint packing for establishing a pressure and temperature resistant seal between two pressure containing members. The seal is self-energizing and is tolerant of small, but significant, relative motion between the flanged members during installation and operation, particularly during uneven elevated temperature conditions such as may occur during a well head fire or other accident. Both these and other advantageous features not herein discussed will be apparent to one skilled in the art upon inspection of the foregoing specification and the appended claims and drawing figures.

I claim:

1. A system for establishing a temperature resistant pressure seal between two flat-faced surfaces, comprising:
   a first groove in the first flat-faced surface disposed along a desired closed sealing line, said groove in cross section having two side surfaces and a bottom surface, the separation of the side surfaces decreasing with increasing depth below the first flat-faced surface;
   a second groove in the second flat-faced surface, symmetrical in shape with the first groove about the plane of the corresponding flat-faced surface and also disposed along the desired sealing line;
   a spring member of resilient metal for placement within the first and second grooves for formation of the desired seal, the spring member having an approximately E-shaped cross section facing the pressurized region, including a central web portion forming the central part of the E-shape and two outer arms, symmetric about and secured to the central web forming the two outer parts of the E-shape, each arm having a curved portion with an overall uncompressed horizontal dimension greater than the separation of the side walls of the first and second grooves at a depth intermediate the corresponding flat-faced surface and the groove bottom surface, and the overall dimension of the spring member cross section taken vertically across the E-shape being greater than the separation of the first and second groove bottom surfaces when the two flat-faced surfaces are placed in contact, for causing the curved portion of each arm of the spring member to contact and be progressively compressed between the side walls of the corresponding groove as the spring member is inserted progressively more deeply within the corresponding grooves and for causing vertical compression of the entire spring member between the bottom surfaces of the first and second grooves when the flat-faced surfaces are in contact, thereby resulting in each arm of the spring member contacting the corresponding groove for forming the desired seal; and means for urging and clamping the two flat-faced surfaces together, with the first and second grooves in a corresponding relationship.

2. The system of claim 1, further comprising a stop member, disposed within the seal passage behind the web portion of the spring member on the unpressurized side, for preventing deflection of the spring member into a concave cross section under high temperature and high pressure conditions.

3. A system for establishing a temperature resistant pressure seal at a joint between a first pressure containing member and a second pressure containing member, comprising:

a first groove, disposed in the first pressure containing member along a closed sealing line, having two side surfaces and a bottom surface substantially parallel to the seal surface of the first pressure containing member, the separation of the two first groove side surfaces decreasing with increasing depth;

a second groove, disposed in the second pressure containing member along the sealing line, having two side surfaces and a bottom surface substantially parallel to the seal surface of the second pressure containing member, the separation of the two second groove side surfaces decreasing with increasing depth;

a spring member for insertion into the first and second grooves, having a generally E-shaped cross section opening toward the interior of the pressure containing members and including a central web section forming the middle of the E-shape and a pair of curved opposing arms forming the extremities of the E-shape, said curved arms being compressible in the horizontal direction by the side surfaces of the first and second grooves upon full insertion of the spring member therewithin and the entire member being compressible in the vertical direction by the action of the grooves when the first and second pressure containing members are fully and sealingly engaged, resulting in an inward deflection of the web section; and means for urging and clamping the first and second pressure containing members together.

4. The system of claim 3 wherein the system further comprises a stop member, located behind the web section, for preventing deflection of the web section outward beyond a preselected point due to internal pressure.

5. The system of claim 3, wherein the spring member is composed of the same material as the flanged members.

6. The system of claim 3, wherein:

the inner side surfaces of the first and second grooves each describe a first chamfer proximate the bottom surface and an unsloped portion intermediate the first chamfer and the pressure containing member seal surface, said unsloped portion being generally perpendicular to the plane of seal surface, and wherein the spring member is freely insertable into each groove during makeup of the joint without the occurrence of compression or deformation, at least until the spring member contacts the first chamfer.

7. The system of claim 6, wherein the inner side surfaces of the first and second grooves each additionally describe a second chamfer adjacent the seal surface of the pressure containing member.

8. A temperature resistant joint packing for a joint between two pressure containing members, comprising:

a continuous spring member of resilient metal having a generally E-shaped cross section, the member in cross section further including a central web section forming the center portion of the E-shape, a first arm secured at one end to the central web and terminating in an inwardly curving section forming the upper end of the E-shape, and a second arm, also secured to the central web and terminating in an inwardly curving section, forming the lower end of the E-shape;

a pair of continuous grooves, each disposed in the seal surface of one of the pressure containing members in a corresponding relationship, for accepting the spring member therein in a sealing configuration, each groove having an inner and an outer side surface with the separation therebetween decreasing generally with increasing depth beneath the corresponding seal surface, a bottom surface, generally parallel to the seal surface of each pressure containing member, the grooves further being configured to accept the spring member therebetween in an uncompressed state when the pressure containing members are in a substantially aligned, but spaced apart, configuration, and to compress the spring member both horizontally by deforming each curved arm between the corresponding inner and outer side surfaces, and vertically by compressing the entire spring member between the grooves, when the pressure containing members are urged together; and means for urging and clamping the pressure containing members together.

9. The joint packing of claim 8, wherein the spring member and the pressure containing members are fabricated of substantially identical materials.

10. The joint packing of claim 8, wherein the pair of grooves are each configured to permit the spring member to be partially inserted therein in an uncompressed configuration during makeup of the joint, and wherein the horizontal and vertical compression of the spring member does not occur until the pressure containing members are almost fully urged together.

* * * * *